United States Patent [19]

Wodeslavsky

[11] Patent Number: 5,282,280
[45] Date of Patent: Feb. 1, 1994

[54] TOILET WATER RESERVOIR INLET AND OUTLET CONTROL VALVE

[76] Inventor: Josef Wodeslavsky, #5 Peter Lynas Ct., Tenafly, N.J. 07670

[21] Appl. No.: 8,979

[22] Filed: Jan. 26, 1993

[51] Int. Cl.⁵ .................................. E03D 1/36
[52] U.S. Cl. .......................... 4/366; 24/415; 137/400; 137/410
[58] Field of Search ............ 4/366, 367, 415; 137/400, 410, 414

[56] References Cited

U.S. PATENT DOCUMENTS

| | | | |
|---|---|---|---|
| 1,750,427 | 3/1930 | Paul | 4/366 |
| 2,278,002 | 3/1942 | Thompson | 137/414 |
| 4,013,091 | 3/1977 | Hudson | 137/414 |
| 4,072,164 | 2/1978 | Kaden | 137/414 |
| 4,258,746 | 3/1981 | Hudson | 137/414 |

FOREIGN PATENT DOCUMENTS

| | | | |
|---|---|---|---|
| 0346580 | 1/1922 | Fed. Rep. of Germany | 4/366 |
| 0352111 | 4/1922 | Fed. Rep. of Germany | 4/366 |

*Primary Examiner*—Robert M. Fetsuga

[57] ABSTRACT

A water conserving refill valve for a reservoir connected to a pressurized water supply. The valve includes a hollow body divided by a diaphragm into a first and second chamber and a hollow plunger extending through the diaphragm between the chambers. The first chamber communicates with the reservoir through a port and the second chamber selectively communicates with the reservoir through a relief valve. The plunger closes communication between the liquid supply and the first chamber while providing communication between the supply and the second chamber in a first position. In a second position, the plunger provides communication between the supply and the first chamber. The plunger is biased to the first position by a float lever. The reservoir includes a flush valve operated by a movable lever and the relief valve is connected to the movable lever to be opened when the flush valve is opened. When the relief valve is opened, the liquid pressure in the second chamber acting on the diaphragm is reduced causing the plunger to move to the second position. As the reservoir refills, the float lever biases the plunger to the first position where it is maintained by increased pressure in the second chamber.

2 Claims, 2 Drawing Sheets

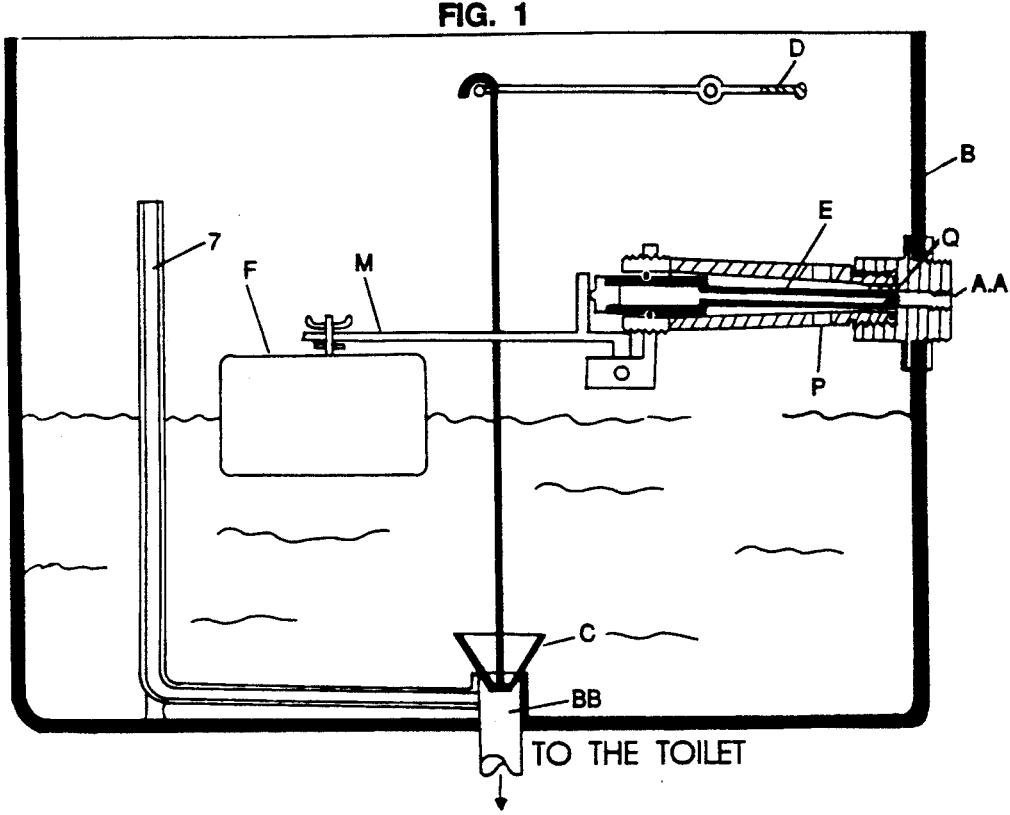
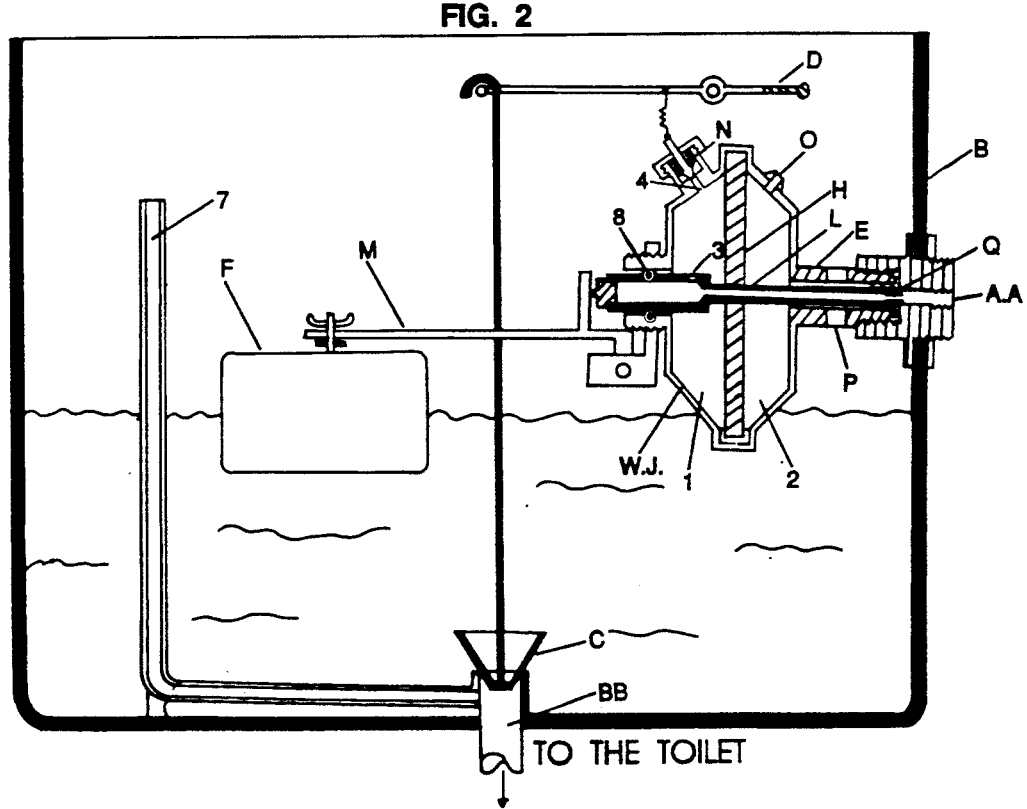

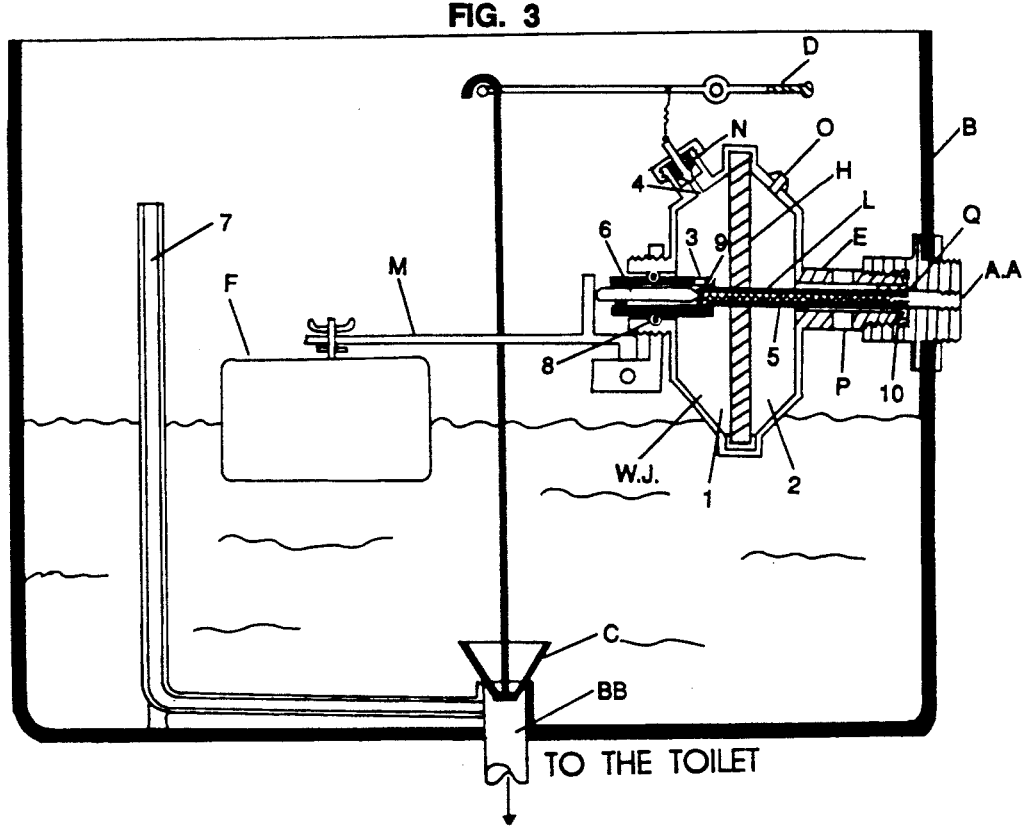

TOILET WATER RESERVOIR INLET AND OUTLET CONTROL VALVE

BACKGROUND OF THE INVENTION

1. Field of the Invention

This invention relates to valves that control the flow of water from a pressurized water line to the water reservoir, this valve will be controlled both by a float and by a hydraulically pressured valve, preventing water leaks which occur in existing flushing systems.

2. Description of the Related Art

There are three known methods for flushing water down the toilet reservoir method, faucet method, and diaphragm controlled method. The first method is the reservoir method which consists of a large reservoir containing a large quantity of water. Once the water is flushed, a valve between the reservoir and the toilet is opened, creating a water fall. This method, which is controlled by a float, has drawbacks. The major drawback of this method is in the design. When the water in the reservoir rises it raises a float, when a sufficient quantity of water has accumulated, the float stops rising as it pressures the valve to shut off the water line inlet. The position of the valve is dictated by the delicate balance between the pressure in the water line and the force from the float. Such a delicate balance of forces is easily offset by a grain of dirt or by the deterioration of the valve. Since the valve is only resting on the water inlet very lightly the valve is disturbed quite easily, causing usual water leaks and large quantity of wasted water. Excess water in the existing system drains out through an overflow pipe, which is connected directly to the water outlet, and into the toilet. My invention solves such wasteful leaks by placing a more reliable valve that will shut off the inlet. Deterioration of the second valve that controls the water flow between the reservoir and the toilet may cause leaks into the toilet. As the water level will decrease, the float will drop releasing the pressure off the valve that is suppose to shut off the opening of the water line inlet. Thus, defects in the second valve may displace the first valve and cause the continuous filling of the reservoir. My invention will not allow the second valve to control the water line inlet. Thus, were there to be a defect in the second valve, only the water that has already filled up the reservoir may be wasted, no additional water will enter into the reservoir from the water line, therefore there will not be a continuous water waste.

The other method that exists to flush water is a faucet like setup whereby the water line is directly connected to the toilet. The drawback of such a method is the usual drawback of most faucets: leaks due to erosion of the insulating material.

The third method is one where a hydraulic instrument, divided into two chambers by a diaphragm, controls the closing of the water inlet via a water pressure differential across the diaphragm. Thus, after the user flushes, this setup allows for an automatic shutting of the water inlet. This device also tends to leak.

Because flushing requires a big quantity of water in a very short period of time, the most common toilet system to be found is the reservoir system. The reservoir method provides that feature, where the other methods do not. The other methods could be installed only where there is a high pressure line. Most locations in the country do not have high pressure lines on a continuous basis.

SUMMARY OF THE INVENTION

There is a strong need for a more reliable method of toilet flushing. The water leaks that result in existing systems are a malfunctions due to bad design. My design assures the secure sealing of the water inlet when no flushing is needed. The advantage of my design also lies in the fact that the accumulation of water in the reservoir depends on two intertwining systems: the common float and a double chambered pressure differential valve that acts like a timer that stops the water flow after a set time period. Unless the water is flushed the valve can not be displaced from its position by dirt.

BRIEF DESCRIPTION OF THE DRAWINGS

FIG. 1 will illustrate the common method of flushing.

FIG. 2 will illustrate the new method of flushing which consists of my invention.

FIG. 3 will illustrate the new method with an added anti-leak protection feature.

PREFERRED EMBODIMENT

FIG. 1 shows the toilet (not shown) connected via pipe BB to the water reservoir B. The connection between the toilet and B is via a valve C which is controlled by a handle-lever D. A water line inlet, AA is connected to the water reservoir B. Water from water line inlet AA is controlled via a valve E, which is controlled by a float F. Over flow pipe 7 is connected directly to outlet BB.

FIG. 2 shows the reservoir B. A valve body E is connected into the water inlet AA. The valve body E is controlled via unit W.J. Unit W.J. consists of two chambers 1 and 2, which are separated by a diaphragm H. A plunger L is connected to diaphragm H. Plunger L has an opening 3 for water to flow from inlet AA to chamber 1. A lever M which is controlled by a float F is connected to valve body E. Leaver M also controls plunger L. Valve body E also consists of another valve 4 which controls the water pressure in chamber 1. Water outlet BB is connected to the water reservoir B. Valve C, which is controlled by a lever D, controls water outlet BB. Chamber 2 of the W.J. unit consists of a vent O which is exposed to atmospheric pressure. The valve body E also has a port P which will allow water to flow from inlet AA to the water reservoir B when plunger L is moved from the plunger seat Q. Seal 8 sits in valve body E in the cavity where plunger L slids, assuring no water leak from chamber 1. Over flow pipe 7 is connected directly to pipe BB.

Initial Water Filling

When handle D is pressed water is flushed, when the handle is released handle D returns. When handle D is pressed, two valves open: valve C and 4. When valve 4 opens, water from chamber 1 rushes out through valve 4 faster than water rushes into chamber 1 via opening 3. This situation arises because the opening of valve 4 is greater than bore 3 in plunger L. Since water pressure in chamber 1 drops as a result of opening of valve 4, the water pressure that acts on plunger L from inlet AA will force the plunger to move from seat Q. As diaphragm H moves as to empty out water from chamber 1, through valve 4, the plunger moves with it away from seat Q opening port P and allowing water into the reservoir from inlet AA. When valve C falls back to its rest position because of its weight, it closes outlet BB, completing the flushing task. Now the second cycle begins when the water level in the reservoir rises this is a consequence of the depression of handle D. Handle D returns causing valve 4 to close by forcing of spring N. When valve 4 closes, water accumulates in chamber 1 via opening 3. When the hydraulic pressure on the plunger is equal to the hydraulic pressure on the diaphragm, there is a greater force on the diaphragm to force the plunger towards seat Q than there is a force on the plunger from inlet AA to remove it from seat Q, the difference in forces is because the surface area of the diaphragm is much larger than the cross sectional area of the plunger which is exposed to the water pressure from inlet AA. Diaphragm H will return to its rest position, pulling along with it plunger L, and plunger L closes communication with port P. Plunger L will move with the diaphragm towards seat Q finally closing port P, stopping the flow of water from inlet AA to reservoir B.

The size of bore 3 will be calculated to allow reservoir B to fill up from port P which is exposed to water line AA, before chamber 1 fills up from bore 3. The size of bore 3 should be such that float F will be able to return to its rest position, where it applys a force on plunger L in the direction of seat Q. Such design will allow float F to apply pressure on plunger L before W.J. unit applys pressure on plunger L. In order to make sure that the water height in the reservoir is controlled by the float when the system is in tact, hydraulic pressure will continue to be built up on the diaphragm which will create mechanical pressure on plunger L, in order to help the float to force plunger L to sit on seat Q. Thus the return of plunger L to its position is secured by the W.J. unit, which will stop the water flow to the reservoir, after a pre set time, after releasing the flushing handle.

During the initial water filling the float will rise with the water level in the reservoir. As the float rises it will force lever M to apply pressure on plunger L, pushing plunger L towards seat Q. When plunger L returns to seat Q it stops the water flow from inlet AA to reservoir B. In case there is a water leak from valve C, float F will not rise to return plunger L to its seat Q. In this case, unit W.J. will move plunger L to its seat by the created water pressure in chamber 1, shutting water inlet AA. This way, a leak in valve C will not produce a continuous flow of water into the toilet.

This invention offers two mechanisms for preventing continuous water flow from inlet AA to reservoir B. If float F fails, W.J. unit will prevent such a leak, if W.J. unit fails, the float will prevent the leak. W.J. unit provides means of using the hydraulic pressure in the line to shut of water inlet AA. This innovative technique is more reliable than the conventional equilibrium technique which is described in FIG. 1.

If at any time there is a water leak from valve C, the float will fall releasing the pressure of lever M from the plunger L, but the plunger will not move from its seat because diaphragm H holds the plunger in place. When the float drops because of a leak, valve 4 is not released. Diaphragm H can not move unless valve 4 is opened. In case of a leak, if sufficient time elapses, all the water from reservoir B will drain out. This technique will notify the next person to flush that there is a leak from valve C because no water fall will occur when lever D is pressed. Still, water will run into the toilet when handle D is continuously pressed, though in a less forceful manner since the plunger will move away from seat Q and port P to allow water from inlet AA to flow into reservoir B and out of outlet BB. The user will note the difference in the force of the water fall, and know its time for maintenance.

As in the conventional system, there is an overflow pipe 7 connected directly to outlet BB. Such a pipe drains any excess water when the water level in reservoir B rises above a certain height. Therefore, if both the float and W.J. unit fail there is a way to prevent a flood in the house. Nevertheless, water is wasted.

The method mentioned above, using a diaphragm to separate the chambers of the unit is only an example of a means that could divide the unit. A piston and a cylinder is another alternative for example.

FIG. 3 is the same as FIG. 2 for the exception of a mechanism that secures against leaks from W.J. valve body itself. Plunger L consists of a valve 6 which controls the water flowing into chamber 1 which is in the dual chamber W.J. The need of such a valve is for the purpose of stopping the water from penetrating to chamber 1, in case of any leak from the valve body itself, or a damage in the parts that this valve body consists of such as diaphragm H, seal 8 and or valve 4.

In plunger L there are three axial bores of different diameters. In the largest bore sits valve 6, in the smallest bore sits spring 5. The connection of the first two bores makes a seat 9 for valve 6. The connection of the last two bores makes a seat 10 for spring 5. In the smaller bore sits spring 5, in the larger bore sits valve 6. Valve 6 controls the water flow from inlet AA into chamber 1. Float F is connected to lever M which controls valve 6 which sits in the bore of plunger L which sits against a spring 5, which sits against a seat 10 in the plunger.

In case of a leak from diaphragm H or/and valve 4 or/and seal 8, configuration 2 can not stop excess water accumulation in the reservoir B. Configuration as described in FIG. 3 offers a mechanism for protecting against such leaks. Valve 6 is held open by spring 5. The force of spring 5 is such that it will not be compressed by lever M while float F is below or at normal level, as a way of example, normal float level occurs when there is 10" of water in the water reservoir which creates an upward force on float F. When there is no leak, under normal water level, when lever D is pressed, the function of this configuration is identical to the function of configuration 2. The only difference lies in the fact that lever M controls valve 6 which indirectly controls the plunger L. In configuration 2, lever M controls plunger L directly.

When water accumulates in reservoir B, if there is no leak, the float will rise with the level of the water, lifting lever M. Lever M applies a force on valve 6 which in turn applies a force on spring 5, which applies a force on seat 10 in plunger L. Thus, the plunger is forced to move back to seat Q, shuting inlet AA. This is the normal function of the unit.

In case of an irregular water level, as when there is a leak, from the diaphragm valve or seal 8 as described above, water accumulates in reservoir B above the normal water level. As the water level will rise, the level of float F rises above its normal level, for example when the water level rises to 12", with an upward force on lever M. This increased force on lever M applies a greater force on valve 6 which forces spring 5 to compress. This situation allows valve 6 to move towards its seat 9, closing the water to bore 3 and thus blocking the opening between inlet AA and chamber 1. Thus, chamber 1 will not fill up with water in case of a leak. This situation assures that if leaks exist in valve 4 and/or diaphragm H and/or seal 8 there will be no continuous water in chamber 1 to leak into reservoir B, because water from inlet AA is blocked. Thus under a leak in any of the above mentioned the float will take over and control the accumulation of water in reservoir B.

What is claimed is:

1. A water conserving refill valve for use in a reservoir connected to a pressurized liquid supply and containing liquid at a liquid level, said reservoir having a gravity operated flush valve opened by a movable flush lever, said valve comprising:

a hollow valve body adapted to be disposed within said reservoir and having a first end portion including a valve seat adapted to be connected to said pressurized supply, and a second end portion;

a diaphragm sealingly disposed across said valve body and disposed between said first and second end portions to define a first chamber at the first end portion and a second chamber at the second end portion, said valve body including a port therethrough at said first end portion to provide communication between said first chamber and said reservoir, said valve body further including a relief valve disposed therein at said second end portion to provide selective communication between said second chamber and said reservoir;

an elongate plunger having a passage therein, said plunger being sealingly connected to and extending through said diaphragm, said plunger having a first end portion engagable with said valve seat such that in a first position said first end portion can close communication between said liquid supply and said first chamber while providing communication between said liquid supply and said passage, and in a second position can open communication between said liquid supply and said first chamber while providing communication between said liquid supply and said passage, said plunger further having a second end portion sealingly extending out of said second chamber and including an opening therein providing communication between said passage and said second chamber;

a float and float lever movably mounted to said valve body and responsive to said liquid level, said float lever engaging said second end portion of said plunger to bias said plunger to said first position when said float is in a position corresponding to a high liquid level in said reservoir; and means for connecting said relief valve to said flush lever;

whereby, after said flush valve closes, said plunger is biased to said first position by said float lever and by liquid pressure in said second chamber acting on said diaphragm and maintained in said first position by liquid pressure in said second chamber acting on said diaphragm, and said second chamber is vented by said relief valve when said flush lever is moved to open said flush valve thereby allowing liquid flow from said liquid supply, into said first chamber and out said port to refill said reservoir.

2. A valve according to claim 1, wherein said plunger further includes valve means operably mounted in said second end portion for controlling liquid flow between said passage and said opening in response to the position of said float lever.

* * * * *